US010095430B2

(12) United States Patent
Ibuki

(10) Patent No.: US 10,095,430 B2
(45) Date of Patent: Oct. 9, 2018

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Takuya Ibuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 58 days.

(21) Appl. No.: 15/045,664

(22) Filed: Feb. 17, 2016

(65) Prior Publication Data

US 2017/0003903 A1 Jan. 5, 2017

(30) Foreign Application Priority Data

Jul. 2, 2015 (JP) ................................. 2015-133178

(51) Int. Cl.
*G06F 3/06* (2006.01)
*G06F 17/30* (2006.01)
(52) U.S. Cl.
CPC ............ *G06F 3/0622* (2013.01); *G06F 3/067* (2013.01); *G06F 3/0647* (2013.01); *G06F 3/0659* (2013.01); *G06F 3/0683* (2013.01); *G06F 17/30887* (2013.01)
(58) Field of Classification Search
CPC ....... G06F 3/0622; G06F 3/0647; G06F 3/067
See application file for complete search history.

(56) References Cited

U.S. PATENT DOCUMENTS

| 7,165,059 B1* | 1/2007 | Shah ..................... G06F 3/0605 |
| 2006/0212746 A1* | 9/2006 | Amegadzie ....... G06F 17/30221 714/6.3 |
| 2014/0006350 A1* | 1/2014 | Fukui ................ G06F 17/30377 707/632 |
| 2014/0258349 A1* | 9/2014 | Meltzer ............. G06F 17/30194 707/827 |

FOREIGN PATENT DOCUMENTS

| JP | 2014-010465 A | 1/2014 |
| JP | 2015-501498 A | 1/2015 |
| WO | 2013/067224 A1 | 5/2013 |

\* cited by examiner

*Primary Examiner* — Edward J Dudek, Jr.
(74) *Attorney, Agent, or Firm* — Oliff PLC

(57) ABSTRACT

An information processing apparatus includes a memory, a receiving section, a storing section, and a sending section. The memory stores a log at least indicating whether each of multiple storage destinations is accessible to a user. The receiving section receives from the user a request for obtaining content. In response to reception of the obtaining request, the storing section stores the content in a storage destination accessible to the user, on the basis of the log stored in the memory. The sending section sends to the user information for accessing the storage destination in which the content has been stored by the storing section.

8 Claims, 14 Drawing Sheets

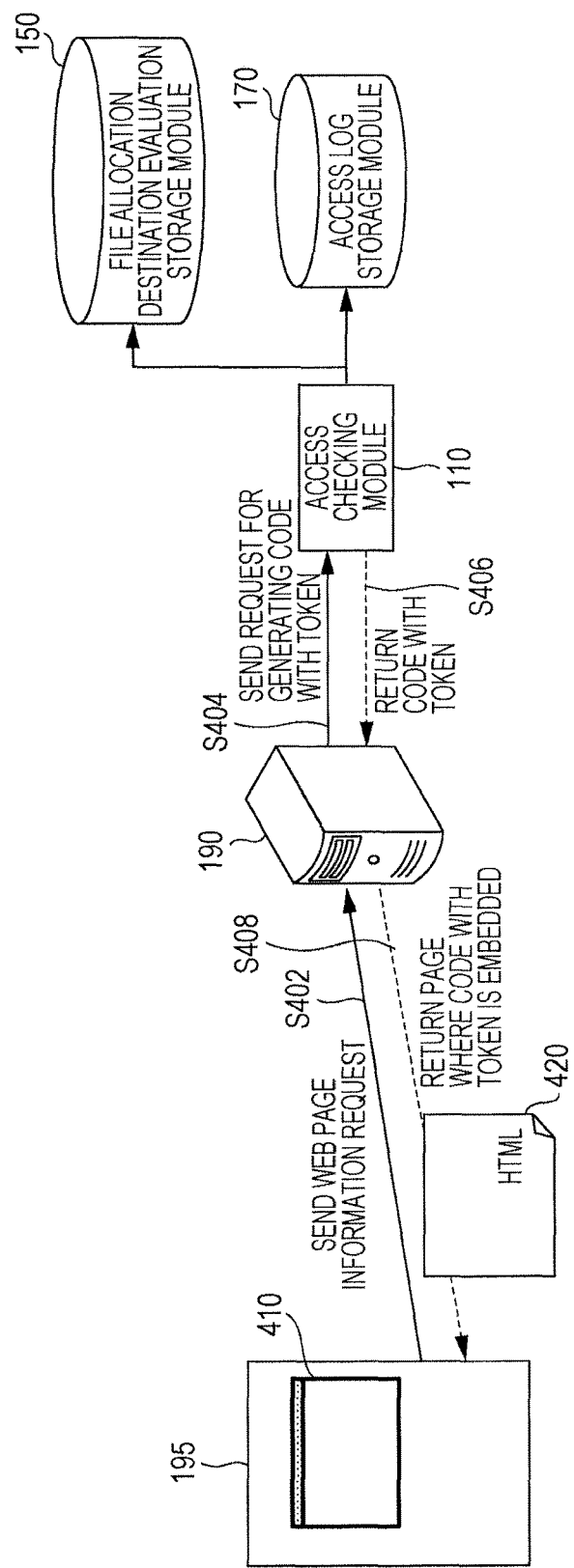

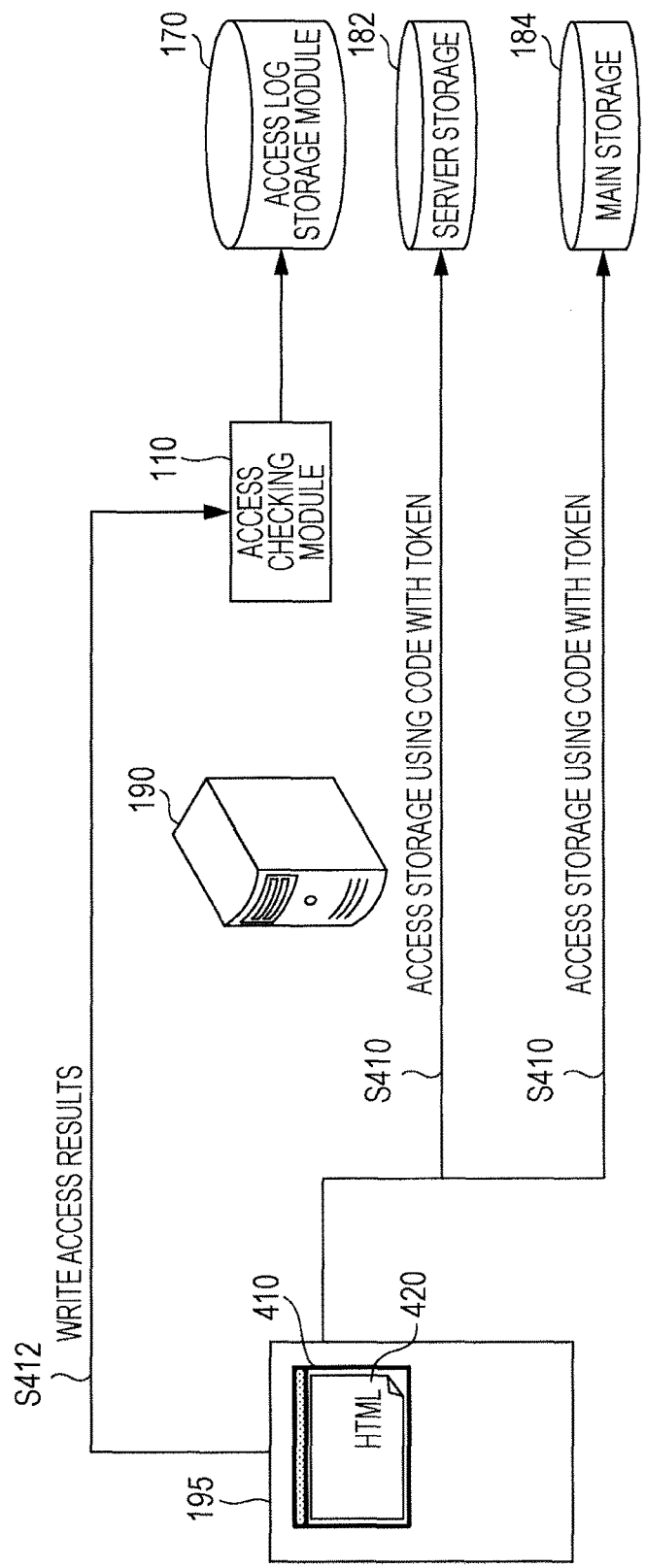

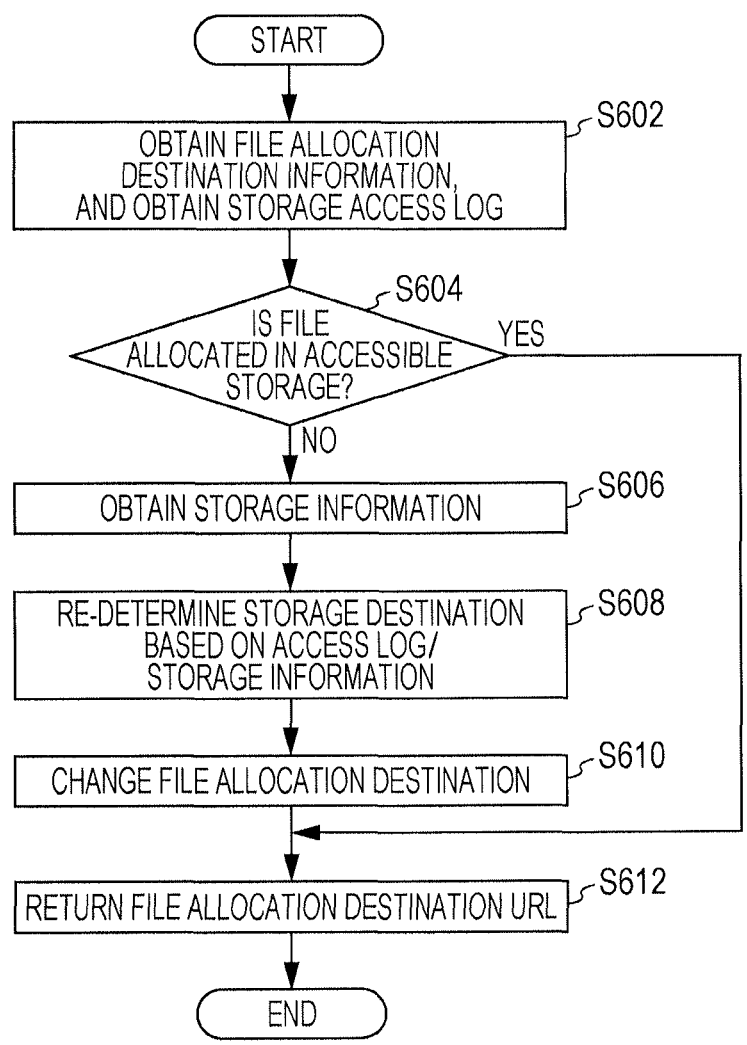

FIG. 7

| STORAGE TYPE | SPEED | COST | CAPACITY | SECURITY RISK | ACCESSIBILITY |
|---|---|---|---|---|---|
| SERVER STORAGE | SUPERIOR | SUPERIOR | INFERIOR | SUPERIOR | SUPERIOR |
| MAIN STORAGE | SUPERIOR | NORMAL | SUPERIOR | NORMAL | SUPERIOR |
| SUB STORAGE | SUPERIOR | SUPERIOR | SUPERIOR | NORMAL | NORMAL |
| BACKUP STORAGE | INFERIOR | SUPERIOR | SUPERIOR | NORMAL | INFERIOR |

FIG. 8

| FILE | POSITION | PATH | SECURITY |
|---|---|---|---|
| File A | MAIN STORAGE | /path/fileA.pdf | High |
| File B | SERVER STORAGE | /path/fileB.pdf | High |
| File C | MAIN STORAGE | /path/fileC.pdf | Low |

FIG. 9

| TOKEN | STORAGE | RESULT |
|---|---|---|
| XXX | SERVER STORAGE | SUCCESSFUL |
| XXX | MAIN STORAGE | FAILURE |
| XXX | SUB STORAGE | SUCCESSFUL |
| XXX | BACKUP STORAGE | SUCCESSFUL |

| URL ISSUING DATE AND TIME | FILE | DOWNLOAD STORAGE |
|---|---|---|
| XX / XX / XXXX | File X | SUB STORAGE |
| YY / YY / YYYY | File Y | BACKUP STORAGE |
| ⋮ | ⋮ | ⋮ |

1310   1320   1330

US 10,095,430 B2

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-133178 filed Jul. 2, 2015.

BACKGROUND (i) Technical Field

The present invention relates to an information processing apparatus, an information processing method, and a non-transitory computer readable medium.

(ii) Related Art

In the related art, content requested to be stored is stored in advance in a certain storage destination, and a user who wants to access that content sends a request to that storage destination. However, individual storage destinations have their own characteristics, and the user tries to access each storage destination from various places (environments where various settings are applied). Thus, the user may sometimes not be able to access the storage destination.

SUMMARY

According to an aspect of the invention, there is provided an information processing apparatus including a memory, a receiving section, a storing section, and a sending section. The memory stores a log at least indicating whether each of multiple storage destinations is accessible to a user. The receiving section receives from the user a request for obtaining content. In response to reception of the obtaining request, the storing section stores the content in a storage destination accessible to the user, on the basis of the log stored in the memory. The sending section sends to the user information for accessing the storage destination in which the content has been stored by the storing section.

BRIEF DESCRIPTION OF THE DRAWINGS

Exemplary embodiments of the present invention will be described in detail based on the following figures, wherein:

FIG. 4 is a diagram illustrating an exemplary process according to the first exemplary embodiment;

FIG. 5 is a diagram illustrating an exemplary process according to the first exemplary embodiment;

FIG. 6 is a flowchart illustrating an exemplary process according to the first exemplary embodiment;

FIG. 7 is a diagram illustrating an exemplary data structure of a file allocation destination evaluation table;

FIG. 8 is a diagram illustrating an exemplary data structure of a file attribute table;

FIG. 9 is a diagram illustrating an exemplary data structure of an access log table;

FIG. 13 is a diagram illustrating an exemplary data structure of a Uniform Resource Locator (URL) issuing log table;

DETAILED DESCRIPTION

Hereinafter, various exemplary embodiments of the present invention will be described on the basis of the drawings.

First Exemplary Embodiment

Figure 1:
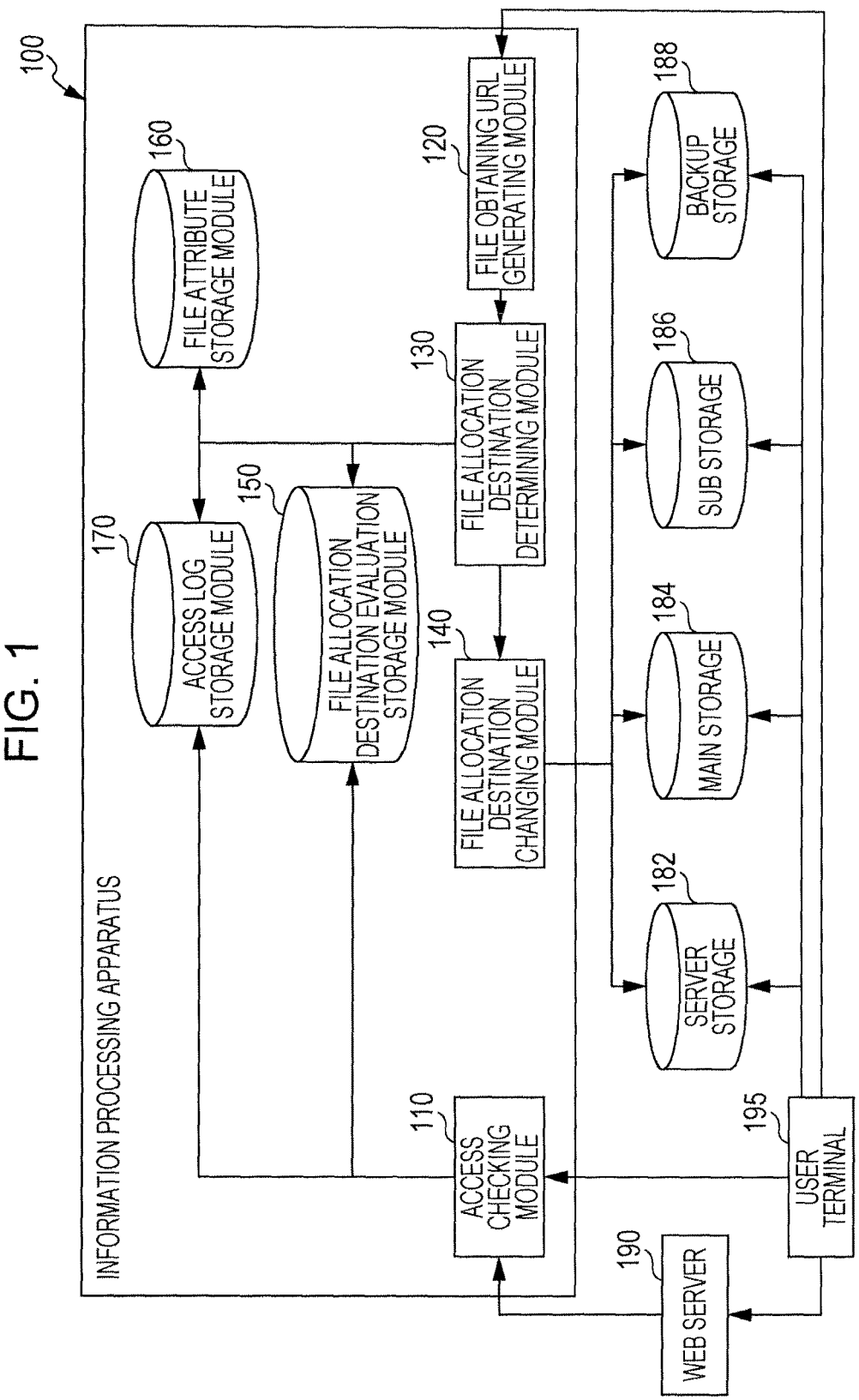
FIG. 1 is a conceptual module diagram of an exemplary configuration according to a first exemplary embodiment.

FIG. 1 is a conceptual module diagram of an exemplary configuration according to a first exemplary embodiment.

Note that the term "module" refers to components such as software (computer programs) and hardware which are typically capable of being logically separated. Consequently, the term "module" in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to implement respective functions), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of multiple "predetermined values", the predetermined values may be respectively different values, or two or more values (this obviously also includes the case of all values)

which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted.

Also, the terms "system" and "device" not only encompass configurations in which multiple computers, hardware, or devices are connected by a communication medium such as a network (including connections that support 1-to-1 communication), but also encompass configurations implemented by a single computer, hardware, or device. The terms "device" and "system" are used interchangeably. Obviously, the term "system" does not include merely artificially arranged social "constructs" (social systems).

Also, every time a process is conducted by each module or every time multiple processes are conducted within a module, information to be processed is retrieved from a storage device, and the processing results are written back to the storage device after the processing. Consequently, description of the retrieval from a storage device before processing and the writing back to a storage device after processing may be reduced or omitted in some cases. Note that the storage device herein may include a hard disk, random access memory (RAM), an auxiliary or external storage medium, a storage device accessed via a communication line, and a register or the like inside a central processing unit (CPU).

An information processing apparatus 100 which is a first exemplary embodiment enables other users to access content (hereinafter may also be referred to as a file). As illustrated in FIG. 1, the information processing apparatus 100 includes an access checking module 110, a file obtaining URL generating module 120, a file allocation destination determining module 130, a file allocation destination changing module 140, a file allocation destination evaluation storage module 150, a file attribute storage module 160, and an access log storage module 170. Although the example in FIG. 1 illustrates four storages (may also be referred to as repositories) as content storage destinations, the number of storages is not particularly limited as long as there are two or more storages. In addition, all storages need not be accessible to a user (or a user terminal 195). Exemplary storages include cloud servers. Content is electronic data (may also be referred to as a file) including text data, graphical data, image data, moving image data, and audio data, or any combination thereof. Content is to be stored, edited, or retrieved. Content is exchangeable as an individual unit between systems or users, and includes its equivalents. A specific example of content includes a document created with a word processing program.

The access checking module 110 is connected to the file allocation destination evaluation storage module 150, the access log storage module 170, a web server 190, and the user terminal 195. The access checking module 110 checks the right to access each storage. For example, the access checking module 110 sends to a user a module for accessing a storage destination capable of storing content. Note that the expression "send to a user" refers to sending a module to a user terminal used by the user. The module is, for example, a code with a token. For example, the code with a token is embedded in a web page, and the web page is sent to a user terminal. When the user opens that web page on the user terminal, the code with a token is executed, thereby accessing the storage destination. In this case, although the user needs to perform an operation to open the web page, the user need not perform any operation to access the storage destination. In other words, any intentional user operation to access the storage destination is unnecessary.

The file obtaining URL generating module 120 is connected to the file allocation destination determining module 130 and the user terminal 195. The file obtaining URL generating module 120 determines an access end point. For example, the file obtaining URL generating module 120 receives from the user a request for obtaining content.

The file allocation destination determining module 130 is connected to the file obtaining URL generating module 120, the file allocation destination changing module 140, the file allocation destination evaluation storage module 150, the file attribute storage module 160, and the access log storage module 170. The file allocation destination determining module 130 determines a storage for allocating content. In response to reception of the obtaining request, the file allocation destination determining module 130 controls the file allocation destination changing module 140 to store content in a storage destination accessible to the user, on the basis of a log stored in the access log storage module 170.

The file allocation destination determining module 130 sends to the user information for accessing the storage destination to which the content has been stored by the file allocation destination changing module 140. For example, the file allocation destination determining module 130 may, for example, send to a user terminal used by the user a web page describing the URL of the storage destination storing the content.

The file allocation destination changing module 140 is connected to the file allocation destination determining module 130, a server storage 182, a main storage 184, a sub storage 186, and a backup storage 188. The file allocation destination changing module 140 changes the storage for allocating the content. For example, under control of the file allocation destination determining module 130, the file allocation destination changing module 140 stores the content in a storage destination accessible to the user.

The file allocation destination evaluation storage module 150 is connected to the access checking module 110 and the file allocation destination determining module 130. The file allocation destination evaluation storage module 150 manages evaluation of storages. For example, the file allocation destination evaluation storage module 150 stores an attribute at least including information that indicates the degree of accessibility of each of multiple storage destinations. Information indicating the degree of accessibility may also be stored according to each user. For example, the file allocation destination evaluation storage module 150 stores a file allocation destination evaluation table 700, for example, illustrated in an example in FIG. 7 described later.

The file attribute storage module 160 is connected to the file allocation destination determining module 130. The file attribute storage module 160 manages an attribute of content. For example, the file attribute storage module 160 stores a file attribute table 800, for example, illustrated in an example in FIG. 8 described later.

The access log storage module 170 is connected to the access checking module 110 and the file allocation destination determining module 130. The access log storage module 170 manages the log of access made to content. For example, the access log storage module 170 stores a log at least indicating whether each of multiple storage destinations is accessible to the user. For example, the access log storage module 170 stores an access log table 900, for example, illustrated in an example in FIG. 9 described later.

In addition, the access log storage module 170 may store, as a log, the result of access made using the module sent to the user by the access checking module 110.

The server storage 182, the main storage 184, the sub storage 186, and the backup storage 188 are connected to the file allocation destination changing module 140 and the user terminal 195. The server storage 182 and the like store content. For example, the server storage 182 is superior to other storages in speed, cost, security risk, accessibility, and so forth, but is inferior in capacity. The main storage 184 is superior to other storages in speed, capacity, and accessibility, but is inferior in cost, security risk, and so forth. The sub storage 186 is superior to other storages in speed, cost, capacity, and so forth, but is inferior in security risk and accessibility. The backup storage 188 is superior to other storages in cost, capacity, and so forth, but is inferior in speed, security risk, and accessibility. As described above, the storages have various characteristics according to their types. In particular, some are accessible to the user (or the user terminal 195), and some are inaccessible to the user (including the case of being unable to log in).

The web server 190 is connected to the access checking module 110 and the user terminal 195. The web server 190 is accessed by the user terminal 195, and sends a web page, for example. Part of the web page is created by the information processing apparatus 100. Information for accessing content stored in the server storage 182 or the like is embedded in the web page.

The user terminal 195 is connected to the access checking module 110, the file obtaining URL generating module 120, the server storage 182, the main storage 184, the sub storage 186, the backup storage 188, and the web server 190. The user terminal 195 is a terminal operated by the user. The user terminal 195 is capable of communicating with the web server 190, the information processing apparatus 100, the server storage 182, and so forth. The user terminal 195 is equipped with a browser. Examples of the user terminal 195 include a personal computer (PC) and a mobile terminal (including a cell phone and a smartphone).

The information processing apparatus 100 may be integrated with the web server 190. In short, the web server 190 may be configured by including the information processing apparatus 100.

Figure 2:
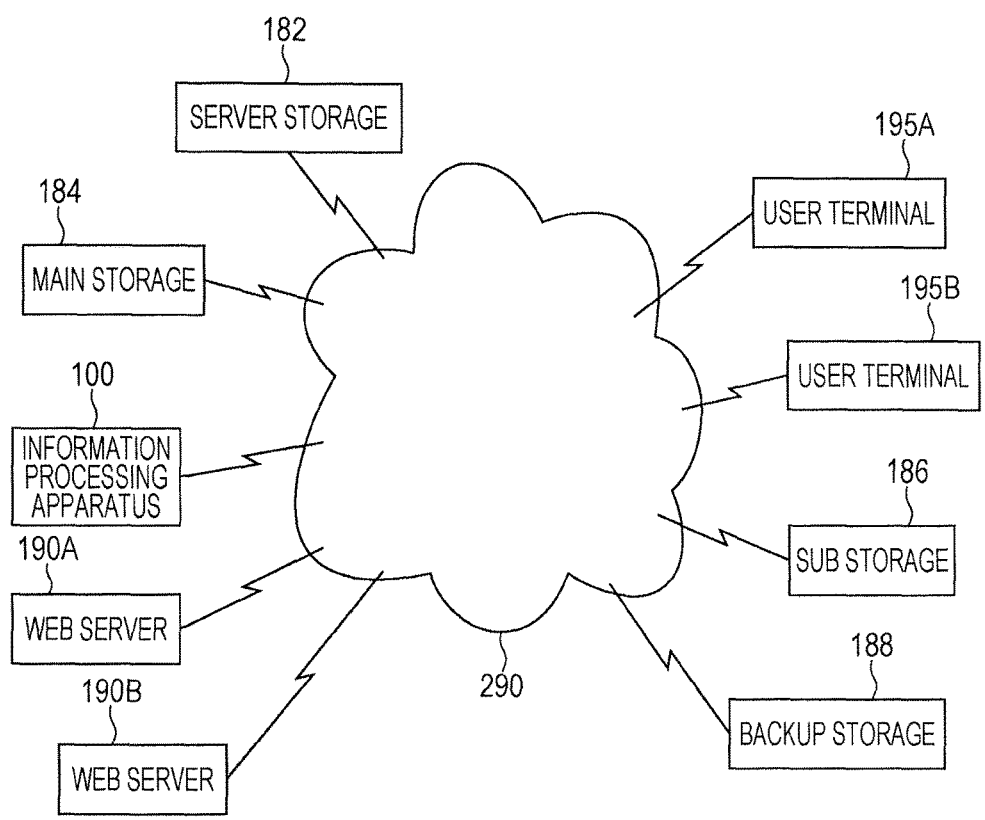
FIG. 2 is a diagram illustrating an exemplary system configuration using the first exemplary embodiment.

FIG. 2 is a diagram illustrating an exemplary system configuration using the first exemplary embodiment.

The information processing apparatus 100, the server storage 182, the main storage 184, the sub storage 186, the backup storage 188, a web server 190A, a web server 190B, a user terminal 195A, and a user terminal 195B are connected to one another via a communication line 290. The communication line 290 may be wireless, wired, or a combination thereof. Examples of the communication line 290 include the Internet serving as a communication infrastructure, and an intranet.

The following case will be discussed in which a user B (an operator of the user terminal 195B) passes content to a user A (an operator of the user terminal 195A). The user B stores content in an accessible storage B. However, the user A is unable to access the storage B, but is able to access a storage A. In this case, using an access log of the user A (may not be the log of access made by an access operation intentionally performed by the user A), the information processing apparatus 100 extracts the accessible storage A, duplicates in the storage A the content stored in the storage B, and sends to the user A information (such as a URL) for accessing the content in the storage A.

Figure 3:
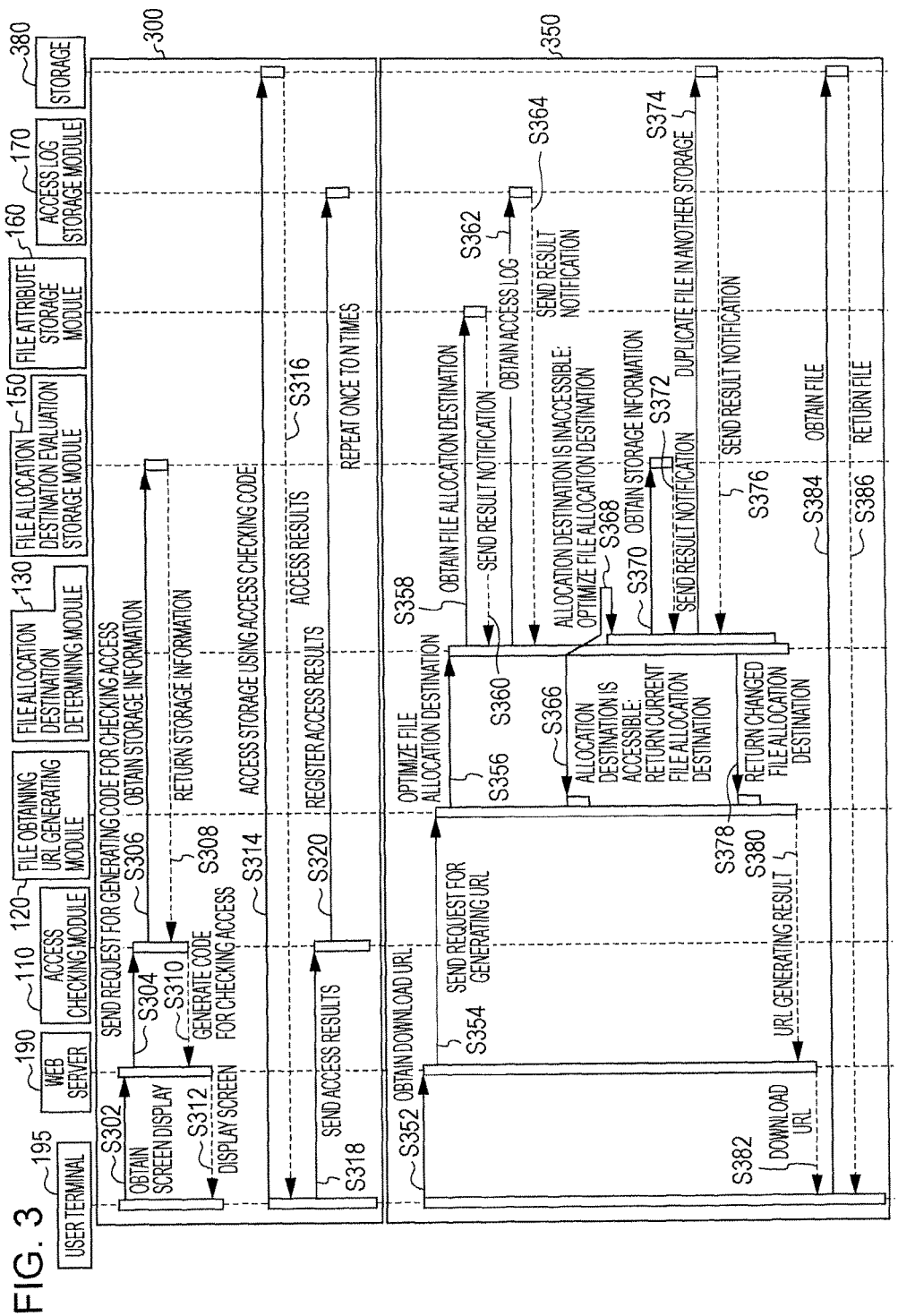
FIG. 3 is a flowchart illustrating an exemplary process according to the first exemplary embodiment.

FIG. 3 is a flowchart illustrating an exemplary process according to the first exemplary embodiment. Note that a storage 380 includes the server storage 182, the main storage 184, the sub storage 186, and the backup storage 188.

In step S302, in response to a user operation, the user terminal 195 performs a screen display obtaining process on the web server 190. Specifically, this process corresponds to sending a web page display request.

In step S304, the web server 190 requests the access checking module 110 to generate a code for checking access. Specifically, the web server 190 requests the access checking module 110 to generate a code for automatically checking access made by the user to the server storage 182, the main storage 184, the sub storage 186, and the backup storage 188.

In step S306, the access checking module 110 obtains storage information from the file allocation destination evaluation storage module 150.

In step S308, the file allocation destination evaluation storage module 150 returns the storage information to the access checking module 110.

In step S310, for the web server 190, the access checking module 110 performs an access checking code generating process using the storage information.

In step S312, the web server 190 displays a screen on the user terminal 195. Specifically, the web server 190 displays on the user terminal 195 a web page including the access checking code embedded therein.

In step S314, using the access checking code, the user terminal 195 accesses each storage (the server storage 182, the main storage 184, the sub storage 186, and the backup storage 188) in the storage 380.

In step S316, the storage 380 sends the access results (whether each access is allowed or not) to the user terminal 195.

In step S318, the user terminal 195 sends the access results to the access checking module 110.

In step S320, the access checking module 110 registers the access results in the access log storage module 170. For example, the access checking module 110 registers the access results in the access log table 900 illustrated in the example in FIG. 9 described later.

A process A300 (steps S302 to S320) is repeated once to N times. Details will be described later using FIGS. 4, 5, and 10.

In step S352, the user terminal 195 requests the web server 190 to obtain a URL for downloading target content (content that the user of the user terminal 195 is trying to download).

In step S354, the web server 190 requests the file obtaining URL generating module 120 to generate the URL.

In step S356, the file obtaining URL generating module 120 optimizes the allocation destination (storage) of the content for the file allocation destination determining module 130. The optimization in this case refers to selecting a storage that is at least accessible to the user terminal 195 and that is suitable for storing the content.

In step S358, the file allocation destination determining module 130 obtains information for determining the content allocation destination from the file attribute storage module 160.

In step S360, the file attribute storage module 160 notifies the file allocation destination determining module 130 of the result.

In step S362, the file allocation destination determining module 130 obtains the log of access made by the user terminal 195 to the storage 380 (the log stored in the access log storage module 170 by the process A300) from the access log storage module 170.

In step S364, the access log storage module 170 notifies the file allocation destination determining module 130 of the result. Depending on the result, the process proceeds to step S366 or S368.

In step S366, which is performed in the case where the content storage destination is accessible to the user terminal 195 (the allocation destination is accessible), the file allocation destination determining module 130 returns the current content allocation destination (specifically, a URL for accessing the content) to the file obtaining URL generating module 120.

In step S368, which is performed in the case where the content storage destination is inaccessible to the user terminal 195 (the allocation destination is inaccessible), the file allocation destination determining module 130 optimizes the file allocation destination. In short, the target content is stored in a storage accessible to the user terminal 195. In terms of this, the process from steps S370 to S376 is performed.

In step S370, the file allocation destination determining module 130 requests the file allocation destination evaluation storage module 150 to obtain the storage information.

In step S372, the file allocation destination evaluation storage module 150 notifies the file allocation destination determining module 130 of the result (the storage information).

In step S374, the file allocation destination determining module 130 duplicates the content in another storage in the storage 380. Specifically, using the storage information obtained in step S372, the file allocation destination determining module 130 extracts a storage at least accessible to the user terminal 195, and stores the target content in that storage.

In step S376, the storage 380 notifies the file allocation destination determining module 130 of the result (information indicating whether the target content has been successfully stored in that storage).

In step S378, the file allocation destination determining module 130 returns the changed content allocation destination (specifically, a URL for accessing the content) to the file obtaining URL generating module 120.

In step S380, the file obtaining URL generating module 120 sends the URL generating result to the web server 190. Using the processing result in step S366 or S378, the file obtaining URL generating module 120 generates a URL indicating a destination where the content is stored, and sends the URL to the web server 190.

In step S382, the web server 190 sends the download URL to the user terminal 195. Specifically, the web server 190 embeds the URL for downloading the target content in a web page, and sends that web page.

In step S384, the user terminal 195 obtains the content from the storage 380 using the download URL.

In step S386, the storage 380 returns the content to the user terminal 195.

A process B350 (steps S352 to S386) is performed after the process A300. Details will be described later using FIGS. 6 and 10.

FIGS. 4 and 5 are diagrams each illustrating an exemplary process (an exemplary process of generating an access log) according to the first exemplary embodiment. This process is automatically performed as a background process between a client (browser in the user terminal 195) and the web server 190 in response to rendering of a web page (in this case, in response to displaying of a web page 420).

Therefore, the user of the user terminal 195 need not intentionally access a storage (step S410) or record the result of access (step S412).

In an example of the exemplary embodiment, this may be performed using javascript illustrated in FIGS. 4 and 5, particularly in terms of an onload process. In this case, the code is automatically loaded and executed at a time point at which the browser completes displaying the page.

FIG. 4 is a diagram illustrating an exemplary process according to the first exemplary embodiment.

A browser screen 410 is displayed on a display device such as a liquid crystal display of the user terminal 195.

In step S402, in response to a user operation, the user terminal 195 sends a web page information request to the web server 190.

In step S404, the web server 190 requests the access checking module 110 to generate a code with a token.

In step S406, the access checking module 110 generates a code with a token using information in the file allocation destination evaluation storage module 150 and the access log storage module 170, and returns the code with a token to the web server 190.

In step S408, the web server 190 returns to the user terminal 195 a web page in which the code with a token is embedded.

FIG. 5 is a diagram illustrating an exemplary process according to the first exemplary embodiment. With the process illustrated in the example in FIG. 4, the browser screen 410 displays the web page 420. The web page 420 is a web page described in, for example, HyperText Markup Language (HTML), and, in this web page, the following code with a token is embedded:

<script>
http://ServerStorage/check.js?token=XXX
http://SubExternalStorage/check.js?token=XXX
</script>

(the code with a token is described in the web page 420).

In step S410, in response to displaying of the web page 420, the user terminal 195 accesses the server storage 182 and the main storage 184 using the code with a token.

In step S412, the user terminal 195 writes the access results in the access checking module 110.

In the case where this is performed using javascript, particularly in terms of an onload process, illustrated in the examples in FIGS. 4 and 5, the code with a token is automatically loaded and executed at a time point at which the browser completes displaying the web page 420.

FIG. 6 is a flowchart illustrating an exemplary process according to the first exemplary embodiment. This process is performed by the file allocation destination determining module 130. This process is performed after the processes illustrated in FIGS. 4 and 5 are performed.

In step S602, the file allocation destination determining module 130 obtains file information from the file attribute storage module 160, and obtains the log of access to each storage from the access log storage module 170. For example, the file attribute storage module 160 stores the file attribute table 800, and the access log storage module 170 stores the access log table 900.

FIG. 8 is a diagram illustrating an exemplary data structure of the file attribute table 800. The file attribute table 800 has a file column 810, a position column 820, a path column 830, and a security column 840. The file column 810 stores a file (information for uniquely identifying a file in the exemplary embodiment, such as a file name). The position column 820 stores a position (storage) where that file is stored. The path column 830 stores a path (path in the storage) where that file is stored. The security column 840 stores security required by that file. For example, in the case where "high" security is required, it is necessary to ensure high security for a storage storing that file. In the case of changing the storage (in the case of duplicating the file in another storage), a new storage may be selected on condition that the same degree of security as the security column 840 of the position column 820 be secured.

FIG. 9 is a diagram illustrating an exemplary data structure of the access log table 900. The access log table 900 has a token column 910, a storage column 920, and a result column 930. The token column 910 stores a code with a token. The storage column 920 stores a storage. The result column 930 stores the result of accessing that storage using that code with a token. With the process described above using the example in FIG. 5, the access log table 900 is generated.

In step S604, it is checked whether there is a file at a place accessible to the user. In the case where there is such an accessible file (YES in step S604), a storage path (URL) recorded in file allocation destination information is determined as a file URL, and the process proceeds to step S612. In the case where there is no such an accessible file (NO in step S604), the process proceeds to an allocation destination changing process (process from step S606 onward). Specifically, using the position column 820 of the file attribute table 800, whether a storage storing a target file is a storage accessible to the user is checked using the access log table 900.

In step S606, available storage information is obtained from the file allocation destination evaluation storage module 150. For example, the file allocation destination evaluation table 700 is stored in the file allocation destination evaluation storage module 150.

FIG. 7 is a diagram illustrating an exemplary data structure of the file allocation destination evaluation table 700. The file allocation destination evaluation table 700 has a storage type column 710, a speed column 720, a cost column 730, a capacity column 740, a security risk column 750, and an accessibility column 760. The storage type column 710 stores storage types (types including the server storage 182, the main storage 184, the sub storage 186, and the backup storage 188). The speed column 720 stores the speed of each storage. The cost column 730 stores the cost of each storage. The capacity column 740 stores the capacity of each storage. The security risk column 750 stores the security risk of each storage. The accessibility column 760 stores the accessibility of each storage. Note that information in the file allocation destination evaluation table 700 is set in advance by, for example, the administrator of each storage.

In step S608, the file allocation destination determining module 130 re-determines the storage destination. Using the information obtained in steps S602, S604, and S606, the file allocation destination determining module 130 determines the storage destination on the basis of a predetermined rule (logic). For example, this determination is made in accordance with, for example, the rule that priority is placed on a storage destination that is "'accessible to the user', 'satisfies the file security', and 'involves an inexpensive cost'". This rule may be defined in advance according to, for example, each user, each content type, or each combination of a user and a content type.

In step S610, using the file allocation destination changing module 140, the file allocation destination determining module 130 duplicates the file in another storage (a storage that satisfies the above-mentioned rule). In short, the allocation destination of the file is changed.

In step S612, the file allocation destination determining module 130 returns a URL indicating the changed file allocation destination.

Thereafter, the user uses the URL to access the content in the storage. Since the storage is a storage that satisfies the above-mentioned rule, the storage is accessible to the user. In the case where the storage satisfies a rule defined for each user, the storage that suits the user is used.

Figure 10:
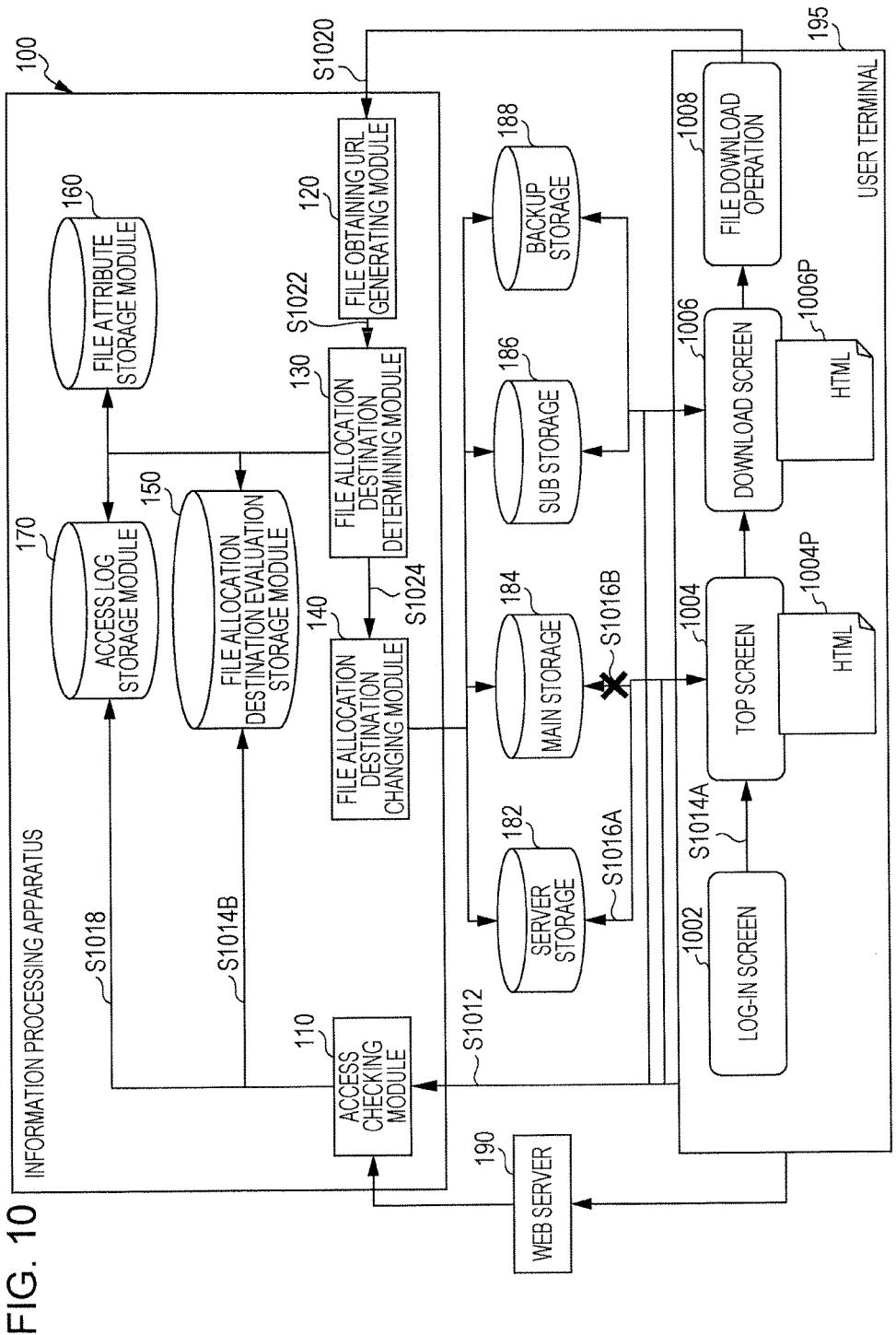
FIG. 10 is a diagram illustrating an exemplary process according to the first exemplary embodiment.

FIG. 10 is a diagram illustrating an exemplary process according to the first exemplary embodiment. The exemplary process illustrates that, in this example, in response to a user operation, the display device in the user terminal 195 sequentially displays a log-in screen 1002, a top screen 1004, and a download screen 1006, and a file download operation 1008 is performed.

In step S1012, the user terminal 195 issues a request to the access checking module 110 in the case where a web page (the top screen 1004 or the download screen 1006) is displayed.

In steps S1014A and S1014B, the access checking module 110 issues a code with a token (access checking code) for a file allocation destination candidate to which a token capable of identifying a user is given, and distributes a web page (a top page 1004P or a download page 1006P) including that code with a token to the user terminal 195.

Note that the top page 10049 is a web page described in HTML, for example. In that web page, the following code with a token is embedded:

```
<script>
http://ServerStorage/check.js?token=XXX
http://MainStorage/check.js?token=XXX
</script>
```

(the code with a token is described in the top page 1004P).

The download page 1006P is a web page described in HTML, for example. In that web page, the following code with a token is embedded:

```
<script>
http://SubExternalStorage/check.js?token=XXX
http://BackupStorage/check.js?token=XXX
</script>
```

(the code with a token is described in the download page 1006P).

In steps S1016A and S1016B, the user terminal 195 accesses each storage using the code with a token. In this example, on the top page 1004P, access is made to the server storage 182 and the main storage 184; and, on the download page 1006P, access is made to the sub storage 186 and the backup storage 188.

In step S1018, if access to each storage is successfully made using the code with a token, a successful record is issued to the access log storage module 170; and if access is unsuccessful, a failure record is issued to the access log storage module 170. In the case of this example, the access results are such that the main storage 184 is inaccessible, whereas the other storages (the server storage 182, the sub storage 186, and the backup storage 188) are accessible. These results are stored in the access log table 900 in the access log storage module 170.

Although the exemplary embodiment discusses the case in which the access checking module 110 registers the access log on behalf of the user terminal 195 in step S1018, the user terminal 195 may register its own access log by itself. In short, it is only necessary to store the determination results each indicating whether the access has been successful or not in the access log storage module 170.

In step S1020, at the time of obtaining the file, the user terminal 195 calls the file obtaining URL generating module 120 by performing the file download operation 1008.

In step S1022, the file obtaining URL generating module 120 calls the file allocation destination determining module 130. The file allocation destination determining module 130 returns the URL of an allocation destination determined by the following steps.

1. Obtain the allocation destination of the file from the file allocation destination evaluation storage module 150.
2. Determine the accessibility of each storage to the user (whether each storage is accessible to the user), using the access log storage module 170.
3. If the file is not present in an area accessible to the user, in step S1024, the file is duplicated in an accessible area using the file allocation destination changing module 140. The destination where the file is duplicated is determined on the basis of an evaluation (rule) that takes into consideration the file allocation destination evaluation table 700 in the file allocation destination evaluation storage module 150 and the file attribute table 800 in the file attribute storage module 160. For example, the destination is determined in accordance with the rule that, according to the security column 840 of the file attribute table 800, for a file for which high security needs to be secured, a repository whose security risk is lower according to the security risk column 750 of the file allocation destination evaluation table 700 is selected.

In order to obtain information indicating the accessibility, although the user tries to access each storage after the user logs in and before the download operation starts, the result of access made to each storage in the past (prior to the current log-in) may be used. However, in order to perform a process that uses the latest access results, the user may preferably try to access each storage after the user logs in and before the download operation starts.

Second Exemplary Embodiment

Figure 11:
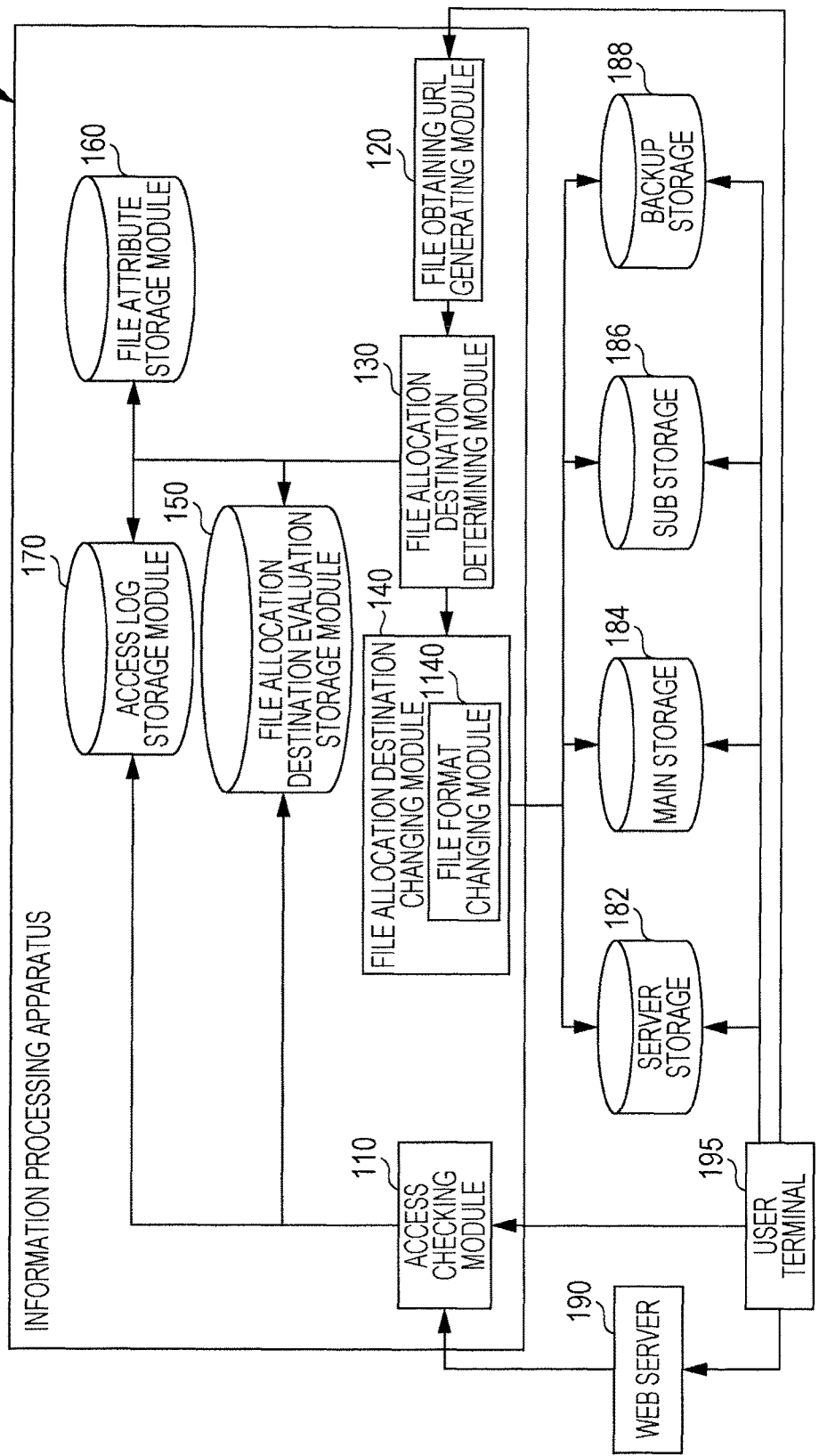
FIG. 11 is a conceptual module diagram of an exemplary configuration according to a second exemplary embodiment.

FIG. 11 is a conceptual module diagram of an exemplary configuration according to a second exemplary embodiment.

An information processing apparatus 1100 includes the access checking module 110, the file obtaining URL generating module 120, the file allocation destination determining module 130, the file allocation destination changing module 140, a file format changing module 1140, the file allocation destination evaluation storage module 150, the file attribute storage module 160, and the access log storage module 170. The information processing apparatus 1100 is configured by additionally having the file format changing module 1140 in the file allocation destination changing module 140 of the information processing apparatus 100 illustrated by way of example in FIG. 1. Note that the same reference numerals are given to the same components as the above-described first exemplary embodiment, and overlapping descriptions are omitted (the same shall apply hereinafter).

In the case where the file allocation destination changing module 140 stores content in another storage, the file format changing module 1140 converts the content and stores the content in a storage destination.

The file allocation destination changing module 140 stores content not only after changing the allocation destination (which corresponds to step S1024 in the example in FIG. 10), but also after changing the format of the content with the use of the file format changing module 1140. For example, in the case of allocating a file for which high security needs to be secured in a storage with a high security risk (in the case of storing content in a storage that does not satisfy a security level required by the content), the content is encrypted and then duplicated. In order to determine whether a storage satisfies a security level required by the content, it is only necessary to compare the security column 840 of the file attribute table 800 with the security risk column 750 of the file allocation destination evaluation table 700. In the case where a storage has a small capacity (the capacity column 740 of the file allocation destination evaluation table 700), the content may be compressed.

Third Exemplary Embodiment

Figure 12:
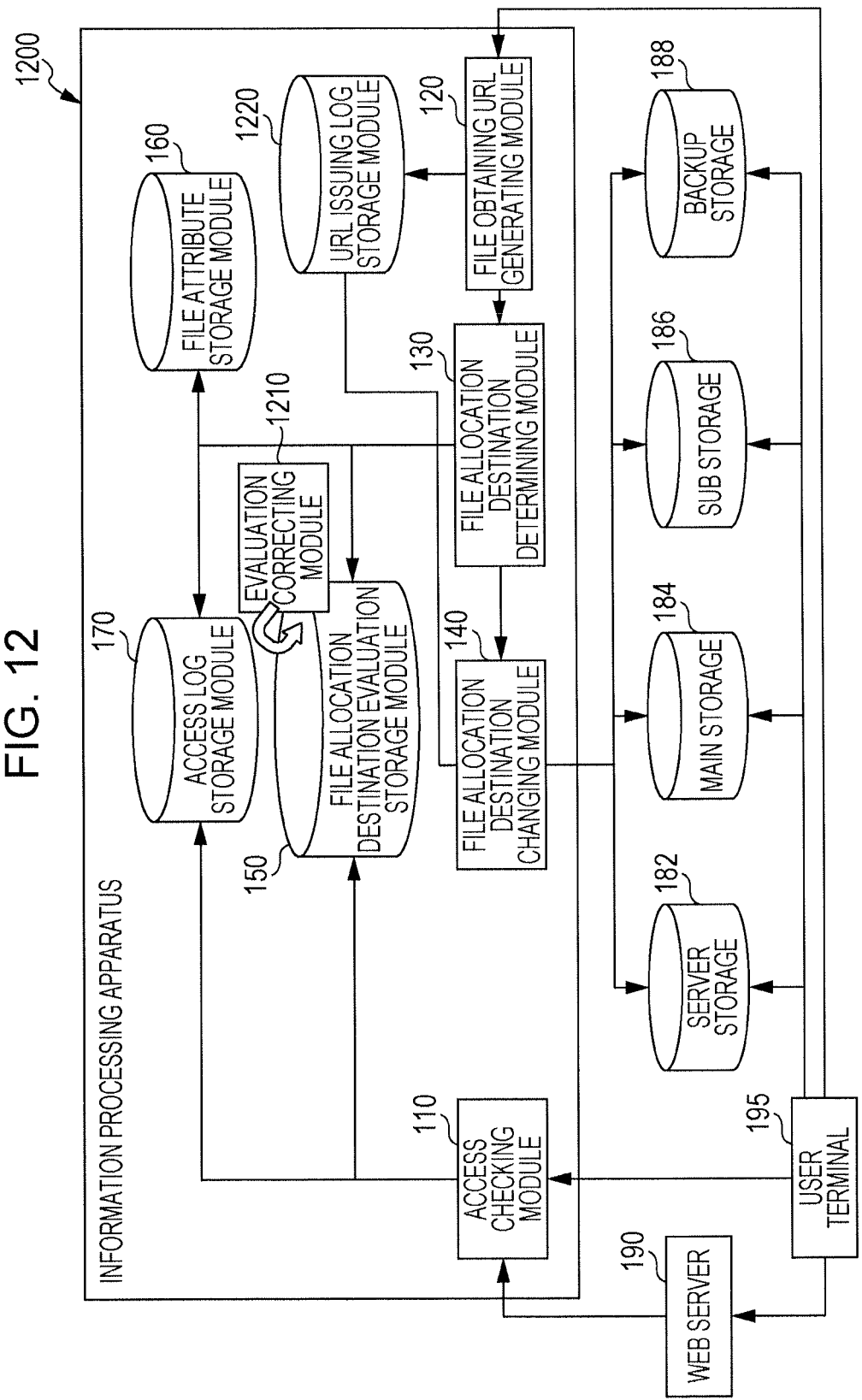
FIG. 12 is a conceptual module diagram of an exemplary configuration according to a third exemplary embodiment.

FIG. 12 is a conceptual module diagram of an exemplary configuration according to a third exemplary embodiment.

An information processing apparatus 1200 includes the access checking module 110, the file obtaining URL generating module 120, the file allocation destination determining module 130, the file allocation destination changing module 140, the file allocation destination evaluation storage module 150, the file attribute storage module 160, the access log storage module 170, an evaluation correcting module 1210, and a URL issuing log storage module 1220. The information processing apparatus 1200 is configured by adding the evaluation correcting module 1210 and the URL issuing log storage module 1220 to the information processing apparatus 100 illustrated by way of example in FIG. 1.

The file obtaining URL generating module 120 is connected to the file allocation destination determining module 130, the user terminal 195, and the URL issuing log storage module 1220.

The file allocation destination changing module 140 is connected to the file allocation destination determining module 130, the server storage 182, the main storage 184, the sub storage 186, the backup storage 188, and the URL issuing log storage module 1220.

The file allocation destination evaluation storage module 150 is connected to the access checking module 110, the file allocation destination determining module 130, and the evaluation correcting module 1210.

The evaluation correcting module 1210 is connected to the file allocation destination evaluation storage module 150. The evaluation correcting module 1210 updates an attribute (information indicating the degree of accessibility) stored in the file allocation destination evaluation storage module 150, on the basis of a log stored in the URL issuing log storage module 1220.

The URL issuing log storage module 1220 is connected to the file obtaining URL generating module 120 and the file allocation destination changing module 140. The URL issuing log storage module 1220 stores the log of access made to content stored (in other words, content whose storage destination has been changed) by the file allocation destination changing module 140. For example, the URL issuing log storage module 1220 stores a URL issuing log table 1300. FIG. 13 is a diagram illustrating an exemplary data structure of the URL issuing log table 1300. The URL issuing log table 1300 has a URL issuing date and time column 1310, a file column 1320, and a download storage column 1330. The URL issuing date and time column 1310 stores the date and time of issuing a URL for accessing content. The file column 1320 stores the content. The download storage column 1330 stores a storage where the content has been downloaded.

Using information indicating that the storage destination has been changed in step S1024 illustrated in the example in FIG. 10 and information indicating that access is made to the content whose storage destination has been changed (the URL issuing log table 1300), the accessibility in the file allocation destination evaluation storage module 150 is corrected in order to improve the accuracy of subsequent evaluations. For example, in the case where the number of times access is actually made is greater than or equal to a predetermined threshold, the accessibility may be set to a high value.

Fourth Exemplary Embodiment

Figure 14:
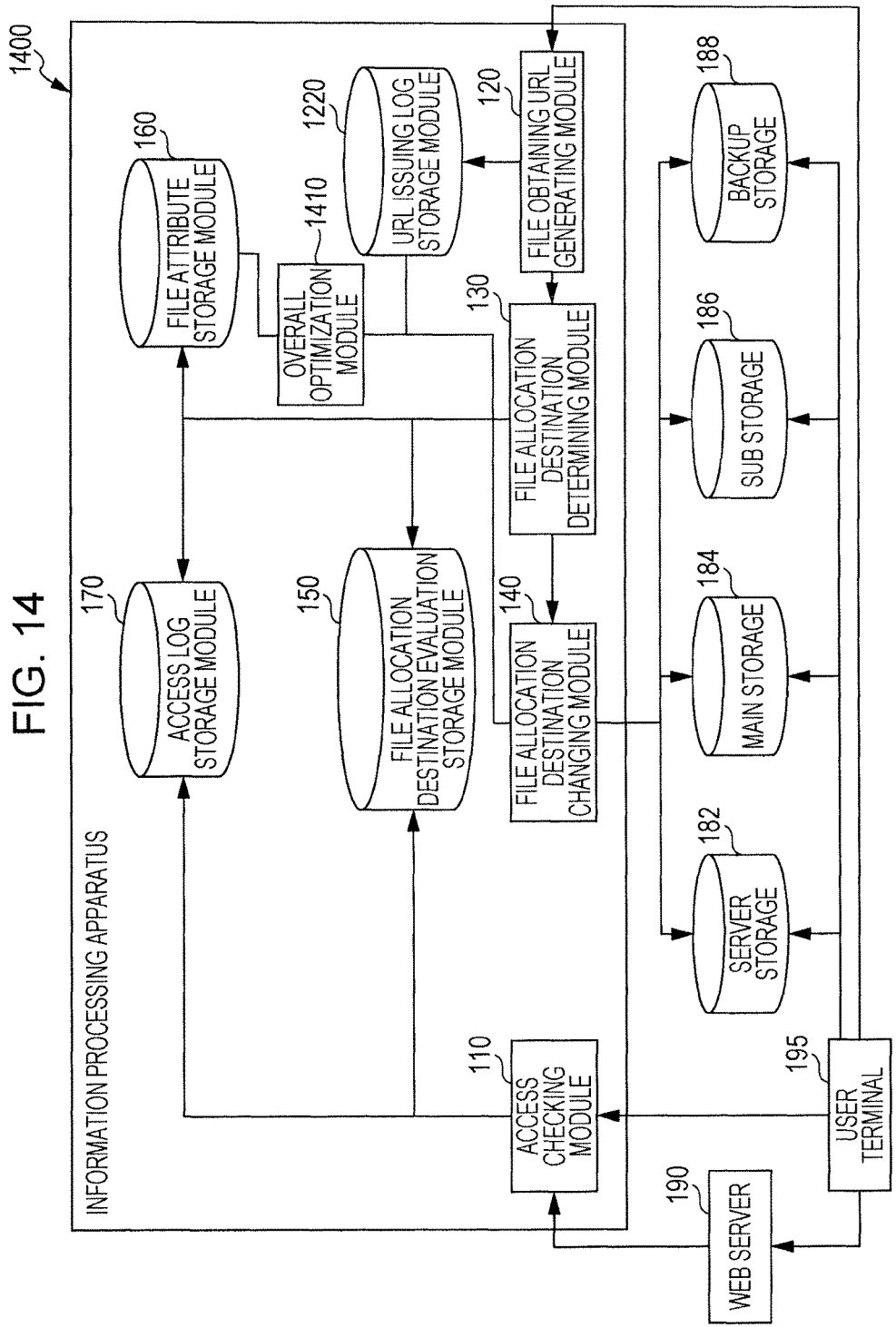
FIG. 14 is a conceptual module diagram of an exemplary configuration according to a fourth exemplary embodiment.

FIG. 14 is a conceptual module diagram of an exemplary configuration according to a fourth exemplary embodiment.

An information processing apparatus 1400 includes the access checking module 110, the file obtaining URL generating module 120, the file allocation destination determining module 130, the file allocation destination changing module 140, the file allocation destination evaluation storage module 150, the file attribute storage module 160, the access log storage module 170, an overall optimization module 1410, and the URL issuing log storage module 1220. The information processing apparatus 1400 is configured by adding the overall optimization module 1410 and the URL issuing log storage module 1220 to the information processing apparatus 100 illustrated by way of example in FIG. 1.

The file allocation destination changing module 140 is connected to the file allocation destination determining module 130, the server storage 182, the main storage 184, the sub storage 186, the backup storage 188, the URL issuing log storage module 1220, and the overall optimization module 1410.

The file attribute storage module 160 is connected to the file allocation destination determining module 130 and the overall optimization module 1410.

The overall optimization module. 1410 is connected to the file allocation destination changing module 140 and the file attribute storage module 160. The overall optimization module 1410 receives a request for storing content. In response to reception of the storing request, the overall optimization module 1410 stores the content, requested to be stored, in a default storage destination among multiple storage destinations. The default storage destination is updated on the basis of information in the URL issuing log storage module 1220 (the log of access made to content stored by the file allocation destination changing module 140).

For example, the number of times the storage destination is changed in step S1024 illustrated in the example in FIG. 10, and the number of times the content is actually accessed are obtained.

In the case where the number of times the storage destination is changed is greater than or equal to a predetermined threshold, when the content is to be stored for the first time instead of being duplicated (not in the case where the user gives an access request), the content is stored in the changed storage destination. In doing so, from this point onward, the number of times the storage destination of the content is changed decreases, and accordingly the number of processes involved in enabling the user to access the content decreases.

In the case where the number of times the content is actually accessed in a predetermined period of time is less than or equal to a predetermined threshold, there is no need to place importance on the accessibility. Thus, the content may be moved to a storage with a lower cost.

Fifth Exemplary Embodiment

Note that the above-described various exemplary embodiments may be combined (for example, a module in a certain exemplary embodiment may be added to, or replaced with another module, in another exemplary embodiment). Also, a technique of the related art may be employed as processing details of each module.

Figure 15:
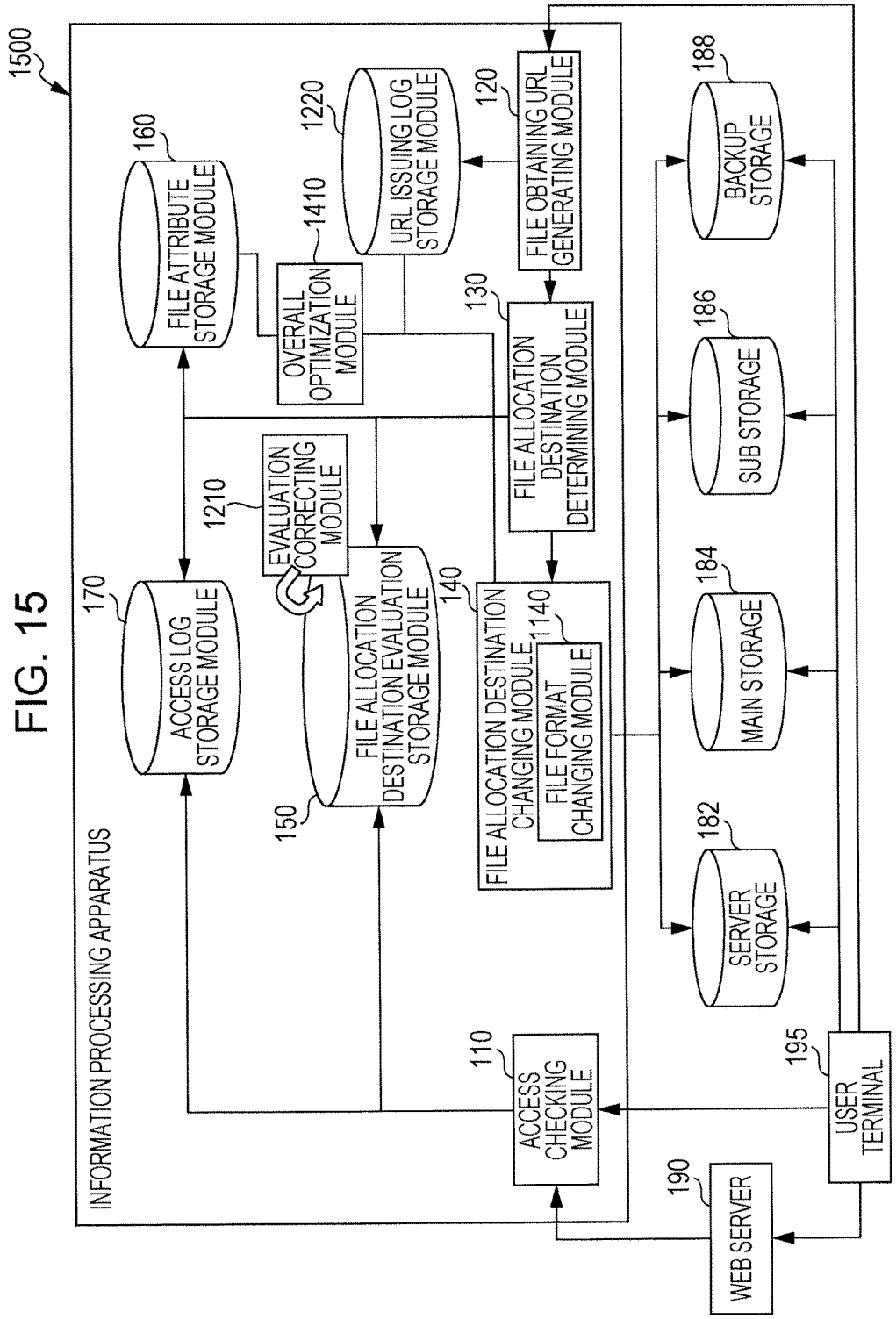
FIG. 15 is a conceptual module diagram of an exemplary configuration according to a fifth exemplary embodiment.

FIG. 15 is a conceptual module diagram of an exemplary configuration according to a fifth exemplary embodiment.

An information processing apparatus 1500 includes the access checking module 110, the file obtaining URL generating module 120, the file allocation destination determining module 130, the file allocation destination changing module 140, the file format changing module 1140, the file allocation destination evaluation storage module 150, the file attribute storage module 160, the access log storage module 170, the evaluation correcting module 1210, the URL issuing log storage module 1220, and the overall optimization module 1410. The information processing apparatus 1500 is configured by adding the file format changing module 1140, the evaluation correcting module 1210, the URL issuing log storage module 1220, and the overall optimization module 1410 to the information processing apparatus 100 illustrated by way of example in FIG. 1.

The overall optimization module 1410 is connected to the file attribute storage module 160, the URL issuing log storage module 1220, and the file allocation destination changing module 140.

Figure 16:
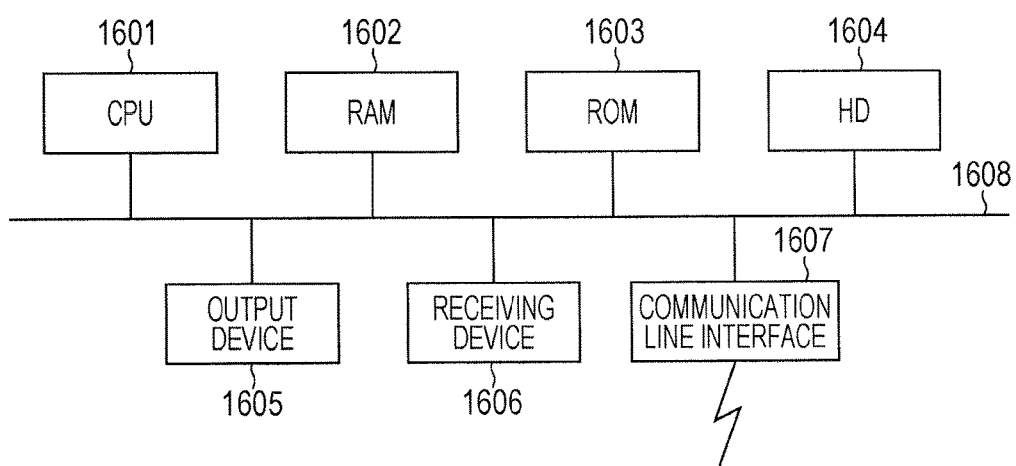
FIG. 16 is a block diagram illustrating an exemplary hardware configuration of a computer implementing an exemplary embodiment.

Note that the hardware configuration of a computer (the information processing apparatus 100, the web server 190, the user terminal 195, the server storage 182, the main storage 184, the sub storage 186, and the backup storage 188) on which a program according to an exemplary embodiment is executed is a general computer, as illustrated in FIG. 16, and specifically is, for example, a computer that may be a personal computer or a server. In short, as a specific example, a CPU 1601 is used as a processor (arithmetic operation unit), and a RAM 1602, a read-only memory (ROM) 1603, and a hard disk (HD) 1604 are used as storage devices. As the HD 1604, for example, a hard disk drive or a solid state drive (SSD) may be used. The computer includes the CPU 1601 executing programs including the access checking module 110, the file obtaining URL generating module 120, the file allocation destination determining module 130, the file allocation destination changing module 140, the file format changing module 1140, the evaluation correcting module 1210, and the overall optimization module 1410, the RAM 1602 storing the programs and data, the ROM 1603 storing a program for activating the computer, the HD 1604 which is an auxiliary storage device (may be a flash memory) (having the functions including the file allocation destination evaluation storage module 150, the file attribute storage module 160, the access log storage module 170, the URL issuing log storage module 1220, the server storage 182, the main storage 184, the sub storage 186, and the backup storage 188), a receiving device 1606 that receives data based on a user operation performed with a keyboard, a mouse, a touchscreen, or a microphone, an output device 1605 such as a cathode-ray tube (CRT), a liquid crystal display, and a loudspeaker, a communication line interface 1607 for connecting to a communication network such as a network interface card, and a bus 1608 that connects these components and enables these components to exchange data. Such computers may be connected to one another via a network.

Of the foregoing exemplary embodiments, for those made up of a computer program, software in the form of a computer program is made to be read into a system with the above hardware configuration, and the foregoing exemplary embodiments are implemented by the cooperative action of the software and hardware resources.

Note that the hardware configuration illustrated in FIG. 16 illustrates a single exemplary configuration, and that the exemplary embodiment is not limited to the configuration illustrated in FIG. 16 insofar as the configuration still enables execution of the modules described in the exemplary embodiment. For example, some modules may also be implemented with special-purpose hardware (such as an application-specific integrated circuit (ASIC), for example), and some modules may be configured to reside within an external system and be connected via a communication line. Furthermore, it may also be configured such that multiple instances of the system illustrated in FIG. 16 are connected to each other by a communication line and operate in conjunction with each other. Additionally, besides a personal computer in particular, an exemplary embodiment may also be incorporated into a device such as an mobile information/communication device (including devices such as a cell phone, a smartphone, mobile equipment, and a wearable computer), information appliance, robot, photocopier, fax machine, scanner, printer, or multi-function device (that is, an image processing device having two or more from among scanning, printing, copying, and faxing functions).

Note that the described program may be provided stored in a recording medium, but the program may also be provided via a communication medium. In this case, a "computer-readable recording medium storing a program", for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

The recording medium may be a Digital Versatile Disc (DVD), encompassing formats such as "DVD-R, DVD-RW, and DVD-RAM" defined by the DVD Forum and formats such as "DVD+R and DVD+RW" defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), or a Secure Digital (SD) memory card, for example.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), the Internet, an intranet, an extranet, or some combination thereof, or alternatively, by being modulated onto a carrier wave and propagated.

Furthermore, the above program may be part of another program, and may also be recorded to a recording medium together with other separate programs. The above program may also be recorded in a split manner across multiple recording media. The above program may also be recorded in a compressed, encrypted, or any other recoverable form.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory that stores a log at least indicating, based on an identity of a user, whether each of a plurality of storage destinations is accessible to the user; and
a processor configured to:
receive from the user a request for obtaining content;
in response to reception of the obtaining request, check, based on the log stored in the memory, whether the content is currently stored in one of the plurality of storage destinations that is accessible to the user;
if the content is currently stored in one of the plurality of storage destinations that is not accessible to the user, change the storage destination of the content by duplicating the content at a storage destination that is accessible to the user; and
send to the user information for accessing the storage destination that is accessible to the user and in which the content has been stored.

2. The information processing apparatus according to claim 1, wherein:
the processor is further configured to send to the user a module for accessing the storage destination that is accessible to the user and in which the content has been stored, and
the memory stores, as a log, a result of access made by using the module.

3. The information processing apparatus according to claim 1, wherein the processor converts the content and stores the content in the storage destination that is accessible to the user.

4. The information processing apparatus according to claim 1, further comprising:
a second memory that stores an attribute at least including information that indicates a degree of accessibility of each of the plurality of storage destinations,
wherein the attribute stored in the second memory is updated based on a log of access made to the stored content.

5. The information processing apparatus according to claim 1, wherein:
the processor is further configured to receive a request for storing the content, and
in response to reception of the storing request, the processor stores the content in a default storage destination among the plurality of storage destinations.

6. The information processing apparatus according to claim 5, wherein the default storage destination is updated based on a log of access made to the stored content.

7. An information processing method executed by a computing device comprising a memory and a processor, the method comprising:

storing a log at least indicating, based on an identity of a user, whether each of a plurality of storage destinations is accessible to the user;

receiving from the user a request for obtaining content;

in response to reception of the obtaining request, checking, based on the stored log, whether the content is currently stored in one of the plurality of storage destinations that is accessible to the user;

if the content is currently stored in one of the plurality of storage destinations that is not accessible to the user, changing the storage destination of the content by duplicating the content at a storage destination that is accessible to the user; and sending to the user information for accessing the storage destination that is accessible to the user and in which the content has been stored.

8. A non-transitory computer readable medium storing a program causing a computer to execute a process, the process comprising:

storing a log at least indicating, based on an identity of a user, whether each of a plurality of storage destinations is accessible to the user;

receiving from the user a request for obtaining content;

in response to reception of the obtaining request, checking, based on the stored log, whether the content is currently stored in one of the plurality of storage destinations that is accessible to the user;

if the content is currently stored in one of the plurality of storage destinations that is not accessible to the user, changing the storage destination of the content by duplicating the content at a storage destination that is accessible to the user; and sending to the user information for accessing the storage destination that is accessible to the user and in which the content has been stored.

* * * * *